United States Patent [19]

Esashi

[11] Patent Number: 4,957,561
[45] Date of Patent: Sep. 18, 1990

[54] COMPOSITION FOR METALLIZING A SURFACE OF CERAMICS, A METHOD FOR METALLIZING, AND METALLIZED CERAMICS

[75] Inventor: Kiyoyuki Esashi, Higashiosaka, Japan

[73] Assignee: Nippon Hybrid Technologies Co., Ltd., Osaka, Japan

[21] Appl. No.: 274,846

[22] Filed: Nov. 22, 1988

Related U.S. Application Data

[63] Continuation-in-part of Ser. No. 73,494, Jul. 15, 1987, abandoned.

[51] Int. Cl.$^5$ ............................................... C09D 1/00
[52] U.S. Cl. .............................. 106/286.3; 106/286.4; 106/286.5; 75/252; 75/238; 501/88
[58] Field of Search ............... 106/286.3, 286.4, 286.5, 106/1.23; 75/252, 238; 501/88

[56] References Cited

U.S. PATENT DOCUMENTS

| | | |
|---|---|---|
| 3,197,290 | 7/1965 | Williams et al. ............ 75/252 |
| 3,352,694 | 11/1967 | Reed et al. ............ 75/252 |
| 3,776,704 | 12/1973 | Benjamin ............ 75/252 |
| 3,776,769 | 12/1973 | Buck et al. ............ 106/1.23 |
| 4,463,058 | 7/1984 | Hood et al. ............ 501/88 |
| 4,485,150 | 11/1984 | Tsuno ............ 75/252 |
| 4,556,607 | 12/1985 | Sastri ............ 106/286.3 |
| 4,609,401 | 9/1986 | Simm et al. ............ 75/252 |

Primary Examiner—Paul Lieberman
Assistant Examiner—Helene Klemanski
Attorney, Agent, or Firm—Cushman, Darby & Cushman

[57] ABSTRACT

A metallizing composition essentially consists of given amounts of Ni, Nb, Cr, C, Si, Zr, SiC and W and is used for metallizing the surface of ceramics such as $Si_3N_4$, SIALON, AlN, high purity alumina and so on. This composition forms a metallized layer having an excellent bonding strength to the ceramic surface.

9 Claims, 2 Drawing Sheets

COMPOSITION FOR METALLIZING A SURFACE OF CERAMICS, A METHOD FOR METALLIZING, AND METALLIZED CERAMICS

CROSS REFERENCE TO RELATED APPLICATION

This is a continuation in part of U.S. Pat. Ser. No. 073,494 filed on July 15, 1987, now abandoned.

BACKGROUND OF THE INVENTION

1. Field of the Invention

The present invention relates to a composition for metallizing the surface of ceramics, such as nitride, oxide and the like.

2. Description of the Related Art

As a prior art for metallizing the surface of ceramics, there is known only a "Mo-Mn method" which utilizes "20% by weight of Mn and the balance of Mo" as a metallizing composition when the ceramics to be metallized is an alumina ceramics including more than several % by weight of a glass phase. In this case, if the ceramics to be metallized contains only a slight amount of the glass phase, a certain % by weight of $SiO_2$, talc or other oxide is added to the above composition as a metallizing composition.

To metallize the surface of ceramics, the metal powder of the metallizing composition, Mo and Mn, is suspended and mixed in a paste forming solution with nitrocellulose and other organic solvents. The mixed paste is coated on the surface of ceramics and then sintered in a wet hydrogen atmosphere having a dewpoint in the range of $-5°$ C. to $20°$ C. at a temperature of from $1300°$ to $1500°$ C. In this case, the forming of the metallized layer occurs because, when the metallizing composition and the alumina ceramic substrate containing the glass phase are sintered, a low melting glass is formed by MnO produced through oxidation and $Al_2O_3$ in the alumina ceramics, which penetrates into voids in the Mo layer and then is bonded to the surface of the ceramics by cooling.

This prior art, however, can not be applied to ceramics sintered bodies of newly developed sintered nitride and oxide ceramics which have an excellent strength, such as $Si_3N_4$, AlN, SIALON, partially stabilized Zirconia, and the like, high purity sintered alumina ceramics having a purity of 99.0% or more, and ceramics containing substantially no glass phase. Therefore, the prior art is not satisfactory as a preliminary treatment when brazing the ceramics to the metal through a brazing alloy.

SUMMARY OF THE INVENTION

An object of the present invention is to provide a new metallizing composition for obtaining a metallized layer having an excellent bonding strength to the surface of ceramics, such as $Si_3N_4$ SIALON, AlN, and high purity $Al_2O_3$, by a metallizing treatment.

According to the present invention, there is provided a composition for metallizing the surface of ceramics by a melting process, said composition essentially consisting of 13.0 to 25.0% by weight of at least one of Nb and Cr, 0.5 to 8.0% by weight of at least one of Zr, Ti and Hf, 1.5 to 3.5% by weight of C, 1.5 to 3.5% by weight of Si, 0.5 to 18.0% by weight of SiC, not more than 10.0% by weight of at least one of Fe, Co, Cu, Mn, Pd, Pt, Ag, Al, Rh, Ru, Au, and V, not more than 22.0% by weight of at least one of W, Ta, Re, and Os, and the balance being Ni.

In a preferred embodiment of the present invention, the metallizing composition essentially consists of 3.0 to 22.0% by weight of Nb, not more than 20.0% by weight of Cr, the sum of Nb and Cr being 15.0 to 22.0% by weight, 1.0 to 5.0% by weight of Zr, 1.5 to 3.5% by weight of C, 1.5 to 3.5% by weight of Si, 0.5 to 18% by weight of SiC, not more than 22% by weight of at least one of W and Ta, and the balance being Ni.

In a further preferred embodiment of the present invention, the composition essentially consists of 3.0 to 22.0% by weight of Nb, not more than 20.0% by weight of Cr, the sum of Nb and Cr being 15.0 to 22.0% by weight, 1.0% to 5.0% by weight of Zr, 0.1 to 3.0% by weight of Ti, 1.5 to 3.5% by weight of C, 1.5 to 3.5% by weight of Si, 0.5 to 18% by weight of SiC, not more than 22% by weight at least one of W and Ta, and the balance being Ni.

The used SiC may be either in the form of powder or whisker.

The composition as defined above may be a powder composition which is advantageously applied to a ceramic body having a complicated surface configuration by previously applying a binder on the complicated surface of the ceramic body and then sprinkling the powder composition thereon. But, in general, the composition of the present invention is preferably in the form of a paste which can be easily applied to a surface of ceramics.

In one aspect of the present invention, there is also provided a process for metallizing a surface of ceramics, comprising the steps of: applying a composition according to claim 1 on the surface of the ceramics; and heating said composition at a temperature of above $1150°$ C. under a non-oxidizing atmosphere to melt said composition, thereby forming a metal layer adhered to said surface of said ceramics.

DESCRIPTION OF THE PREFERRED EMBODIMENTS

Figure 1:
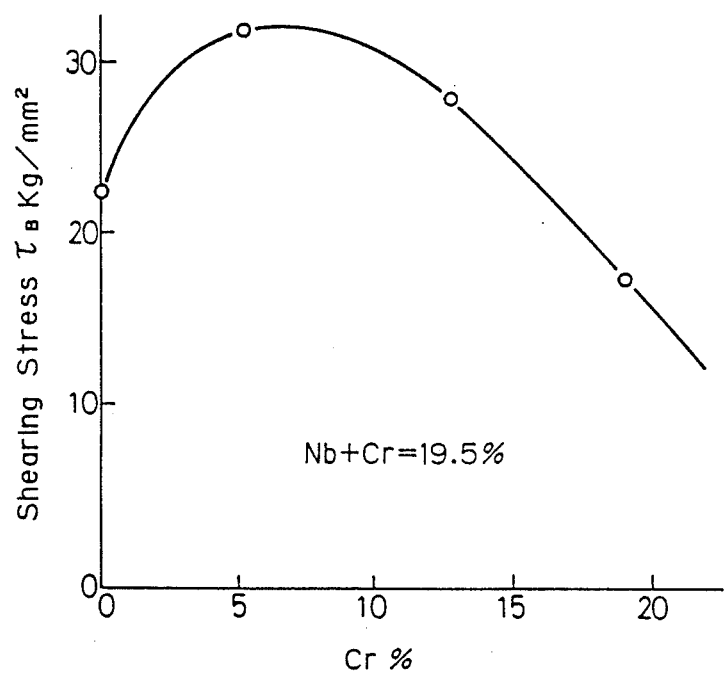
FIG. 1 shows the relationship between the percentage (%) of Cr and the shearing stress $\tau_B$ ($kg/mm^2$), changing the ratio of Nb to Cr, in the composition containing 2.54% by weight of C, 2.44% by weight of Si, 3.5% by weight of Zr, 2.0% by weight of SiC whisker, and, the sum of Nb and Cr of 19.5% by weight.

The ceramics to be used in the present invention include nitrides and oxides, such as $Si_3N_4$, Aln, SIALON, $Al_2O_3$, and MgO.

The chemical components in the metallizing composition according to the present invention will be described hereinafter.

Niobium (Nb) decreases the melting point by forming eutectic crystal reaction with nickel (Ni). Further, an intermetallic compound $Ni_3Nb$ formed between Ni and Nb may exhibit a large plasticity at room temperature in a certain crystal direction, so that a plasticity can be given to a metallized layer formed by melting or half-melting, and consequently, the residual stress caused by the difference of thermal expansion and contraction between the ceramics and the metallized layer is relaxed to enhance the bonding force. Moreover, Nb is an active element, although no more active than Zr, so that it is easy to form silicide, nitride and oxide through the reaction with ceramics, to thereby increase the bonding force between the metallized layer and the ceramics. Nb may be added in a large amount and maintains a wetting property to ceramics at the beginning of melting or at the time of half-melting, and thus is a very useful element for preventing a reduction of the metallized area coating of paste.

Chromium (Cr) is used for forming a solid solution with Ni in a large composition range and to decrease the melting point. Cr is the same active element as Nb, and thus improves the wetting property to ceramics and makes it easy to form the silicide, nitride and oxide through the reaction with ceramics, thereby reinforcing the bonding force to ceramics. Nevertheless, Cr does not increase the plasticity of the metallized layer as does Nb, so that when the amount of Cr is large, the Cr compound or Cr carbide formed during the metallized process makes the metallized layer hard and brittle, and is liable to produce cracks in the metallized layer. Nevertheless, Cr forms a strong compact Cr-rich oxide film on the surface of the metallized layer in air at a high temperature above 800° C., resulting in a prevention of oxidation and an improvement of the corrosion resistance of the metallized layer.

Accordingly, at least one of Nb and Cr is added in an amount of 13 to 25% by weight, which amount does not excessively react with ceramics and appropriately decreases the melting point. Further, Nb has an effect of absorbing and decreasing the stress and strain caused by the difference of thermal expansion and shrinkage of the metallized layer and ceramics, thereby preventing the formation of microcracks frequently caused in the metallized layer when alloying Cr alone, and thus preferably the metallizing composition has 3.0 to 22.0% by weight of Nb and not more than 20.0% by weight of Cr, provided that the sum of Nb and Cr is 15.0 to 22.0% by weight.

Zr, Ti or Hf is a very active element and has a greater reactivity to ceramics than Nb or Cr, so that these elements from the silicide, nitride and oxide are added at the ceramic side in the boundary between the metallized layer and the ceramics by a diffusion thereof into the ceramics to an extent of from 0.01 to 0.05 mm, whereby the bonding force between the metallized layer and the ceramics is considerably increased. Too large an addition, however, causes the formation of a hard and brittle compound with Ni and raises the melting temperature of the metallizing composition, which decreases the fluidity, and thus unfavorably forms fine pores in the metallized layer. Therefore, at least one of Zr, Ti or Hf is added in an amount of 0.5 to 8.0% by weight.

Among these three elements, a minimum amount of Zirconium (Zr) effectively decreases the melting point of Ni, Hf is the most expensive metal, and Ti has a comparatively low activity compared with Zr, and thus it is preferable to utilize Zr as the more effective element.

The addition of Ti to about half the amount of the Zr content can lower the melting point of the metallizing composition, and thus the decomposition of ceramics at high temperature can be prevented.

In a practical high temperature process for metallizing the ceramics, $O_2$ remains in the high temperature atmosphere at which is highly reactive with Zr and Ti. When the amount of Zr is about 0.5% and Ti is about 0.08%, the properties of the metallized layer become unstable, and when Zr exceeds 6% and Ti exceeds 3.5%, Zr oxide, formed by bonding with the remaining $O_2$, deteriorates the fluidity and wetting property of molten components in the metallized layer, thereby preventing the formation of a compact metallized layer. Therefore, the amount of Zr is preferably from 1.0 to 5.0% by weight, and Ti is from 0.1 to 3.0% by weight.

Carbon (C) lowers the melting temperature of the metallizing composition together with silicon (Si). In this case, C alone can not lower the melting temperature to about 1200° C., and thus it is necessary to coexist C and Si. Unless otherwise processed in an atmosphere of nitrogen or inert Ar gas, for example, $Si_3N_4$, a decomposition into Si and N begins at a temperature of about 1250° C., and unless otherwise processed in the oxidizing atmosphere, high purity $Al_2O_3$ is locally reduced at the surface at 1200° C. or more, and thus it is not preferable to perform the metallizing at 1200° C. or more.

Silicon (Si) is very effective for increasing the fluidity at the molten state of the metallizing composition. But when too large an amount of Si is included, a large number of hard and brittle silicides is formed in the metallized layer, which deteriorates the mechanical properties or produces cracks, so that the melting temperature can not be lowered only by adding a large amount of Si. Therefore, preferably 1.5 to 3.5% by weight of C and 1.5 to 3.5% by weight of Si are added to the composition.

Silicon carbide compound (SiC) has a good wetting property to the metallizing composition according to the invention and provides a stable source of C and Si by local fusion through reaction. In the metallizing treatment, therefore, when melting of the composition is difficult because of a lack of C and Si due to temperature fluctuations or scattering, or when the C amount is undesirably reduced because of the formation of $CO_2$ gas with the remaining $O_2$ in the atmosphere, Si and C may be eluted from the SiC compound to an equilibrium amount at the treating temperature thereof, to obtain a stable product. Since SiC has a small thermal expansion coefficient ($5.5 \times 10^{-6}$/°C.), the remaining SiC distributed in the metallized layer lowers the thermal expansion coefficient of the metallized layer and approaches the values of the thermal expansion coefficient of $Si_3N_4$ ($3.2 \times 10^{-6}$/°C.), SIALON ($3.2 \times 10^{-6}$/°C.), and ($6.5 \times 10^{-6}$/°C.), thereby effectively decreasing the residual stress and the strain. If the SiC compound is added in an amount of more than 18% by weight, the amount of brittle compound phase of Si and C (which is eluted from the SiC) with the other metal elements in the layer is increased, and the metallized layer loses plasticity. The remaining SiC compound phase also reduces the plasticity of the layers. Therefore, it is preferable to add the SiC compound in an amount of 0.5 to 18% by weight or less as the form of powder particle.

It is also possible to mix SiC whisker, as the SiC compound, with a diameter of not more than 0.01 μm, no dislocation, and excellent mechanical properties such as a tensile strength of 300 kg/mm$^2$.

The composition also preferably contains 0.5 to 18% by weight of SiC whisker as a stable source for Si and C. The residual SiC whisker will not reinforce the layer if the residual amount is too small.

Fe, Co, Cu, Mn, Pd, Pt, Ag, Al, Rh, Ru, Au, or V makes a solid solution or an eutectic crystal and is liable to alloy together with Ni, Cr, Nb, Zr, Ti, Si, and so on, which are major components of the composition according to the present invention, so that at least one of these elements may be added in an amount of not more than 10.0% by weight. However, when these elements are added in an amount of more than 10.0% by weight, the metallized layer lacks luster and has a very uneven surface, and the bonding force between the metallized layer and the ceramics is unfavorably reduced.

Therefore, preferably at least one of Fe, Co, Cu, Mn, Pd, Pt, Ag, Al, Rh, Ru, Au, and V is added in an amount of not more than 10.0% by weight.

W, Ta, Re and Os are elements possessing extremely high melting points and are not completely melted down even though the other elements in the composition according to the present invention are molten at a temperature of between 1200° and 1300° C., and thus may be used as a filter component. These elements are also metals having a small value of thermal expansion coefficient within a range of 4.5 to 6.6×10$^{-6}$/°C., so that it is possible to add at least one of W, Ta, Re and Os in an amount of not more than 22.0% by weight to adjust the thermal expansion coefficient of the metallized layer or increase the heat resistance thereof. But, when the amount is too large, the flexibility of the metallized layer is degraded, so that the upper limit should be 22% by weight.

In order to sinter or cement the metallizing composition according to the present invention to the body of various kinds of ceramics, mixed powders are prepared by mixing a part or the whole of the powders of 150 mesh or less, preferably 325 mesh or less, more particularly 500 mesh or less, for forming finer metallized patterns corresponding to the above described composition. In order to add a proper fluidity and adhesion force to the metallized paste, ethyl cellulose vehicle or acrylic vehicle as a binder is mixed together with the metal powders to form a paste. The resulting powdery paste is coated on the given surface of ceramics by using a proper application means, such as screen printing, a brush, a spatula or the like.

When applying the composition according to the present invention to the ceramic body having a curved surface to be metallized, such as the inside of a tube, a binder such as ethyl cellulose is previously applied on the surface and then the powder of the composition itself can be sprinkled thereon and the thin coated layer of the powder composition can achieve the same object as the paste composition.

After drying, the coating is melted or half-melted by heating at a temperature between 1200° and 1300° C. in a non-oxidizing atmosphere such as Ar, Ni, H$_2$ or under a vacuum for about 5 to 25 minutes, whereby the metallized layer is cemented or bonded on the surface of ceramics.

Then, a metal having an oxidation resistance, such as Ni, Co, Ag, Au, Pt, Pd, Rh, Ru or the like is coated on the surface of the sintered ceramic body. This is formed by metallizing the surface of Si$_3$N$_4$, SIALON, AlN, partially stabilized Zirconia, high purity Al$_2$O$_3$ or the like with the metallizing composition according to the present invention, to a thickness of about 0.001 to 0.010 mm, by a plating method such as galvanizing, electroless (chemical) plating, fused metal coating or a physical coating method such as vapor deposition, or by sputtering.

This coated layer effectively prevents a deterioration of fluidity of the brazing alloy, which is caused by an oxidation of active elements in the metallized layer with the remaining O$_2$ in the atmosphere of a brazing furnace, as when brazing metallized ceramic bodies with metal materials using silver, gold brazing alloy, nickel brazing alloy, palladium brazing alloy or copper brazing alloy.

The ceramic products provided at their surfaces with the metallized layer according to the present invention may be brazed to a practically useful metal or alloy, such as copper, kovar, tungsten, molybdenum, silver, aluminium or an alloy thereof. Further, these ceramic products may be brazed to a hard metal or alloy having a large thermal expansion coefficient, such as Inconel, heat resisting steel, Hastelloy, carbon steel or the like, by using an intermediate soft buffer material.

According to the present invention, the sintered ceramic bodies such as Si$_3$N$_4$, SIALON, AlN, high purity Al$_2$O$_3$, MgO and the like having the metallized layer with a large bonding force, which is difficult to produce in the prior art, may be manufactured. The sintered ceramic bodies according to the present invention are effectively applicable to various kinds of ceramic applications, for example, engine parts for vehicles, wear-resistant parts, radiating plates, electronic circuit boards, high-temperature jigs, knifes, tools, vacuum valve circuit breakers and the like.

EXAMPLE 1

Various metallizing compositions from No. 1 to No. 26 according to the present invention as shown in Table 1 were prepared by mixing fine powder particles of respective components with 325 mesh or less, or further mixing with SiC whiskers. The metallizing composition was mixed with ethyl cellulose vehicle to form a paste, which was coated to an end surface of a pressureless sintered Si$_3$N$_4$ ceramic body having a diameter of 15.0 mm and a height of 7.0 mm by a screen printing method. After drying, the paste applied body was heated at a temperature of between 1230 and 1240° C. for 10 minutes to form a metallized layer having a thickness of 0.03 to 0.06 mm.

Thereafter, the metallized body was subjected to Ni plating to a thickness of about 0.005 mm and brazed to an end face of W metal pieces having a diameter of 7.0 mm and a length of 10 mm with a eutectic silver brazing alloy by heating at a temperature of 840° C. in H$_2$ atmosphere for a few minutes, and then cooled in a furnace. A shearing test was then carried out and a very high bonding strength as shown in Table 1 was obtained.

The shearing strength T$_B$ was measured with respect to a series of compositions No. 1–No. 4 in Table 1 comprising 2.54% by weight of C, 2.44% by weight of Si, 3.5% by weight of Zr, 2.0% by weight of SiC whisker, and the sum of Nb and Cr of 19.5% by weight at a constant value, but the ratio of Nb to Cr was changed. The obtained result is shown in FIG. 1. As seen from FIG. 1, when the amount of Nb is large, the flexible metallized layer as previously mentioned is formed so that the residual stress and strain are less and the strength is high.

Figure 2:
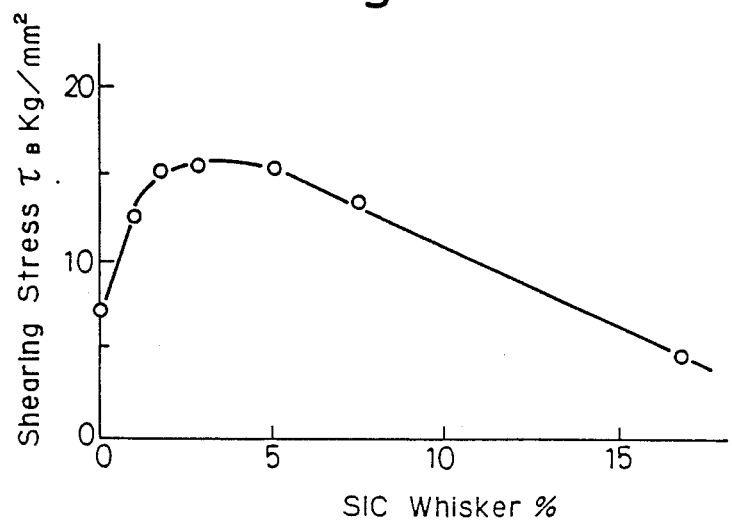
FIG. 2 shows the relationship between the percentage (%) of SiC whisker and the shearing stress $\tau_B$ ($kg/mm^2$), changing the amount of SiC whisker in the composition containing 15.0% by weight of Nb, 5.0% by weight of Cr, 2.54% by weight of C, 2.44% by weight of Si and 3.5% by weight of Zr.

The measured results of the shearing strength $\tau_B$ of the compositions No. 5–No. 11 of Table 1 comprising 15.0% by weight of Nb, 5.0% by weight of Cr, 2.54% by weight of C, 2.44% by weight of Si, 3.5% by weight of Zr and a changed percentage of SiC whisker are shown in FIG. 2, from which it is apparent that, when the percentage of SiC whisker is within 1.0 to 5.0% by weight, the strength is high.

Figure 3:
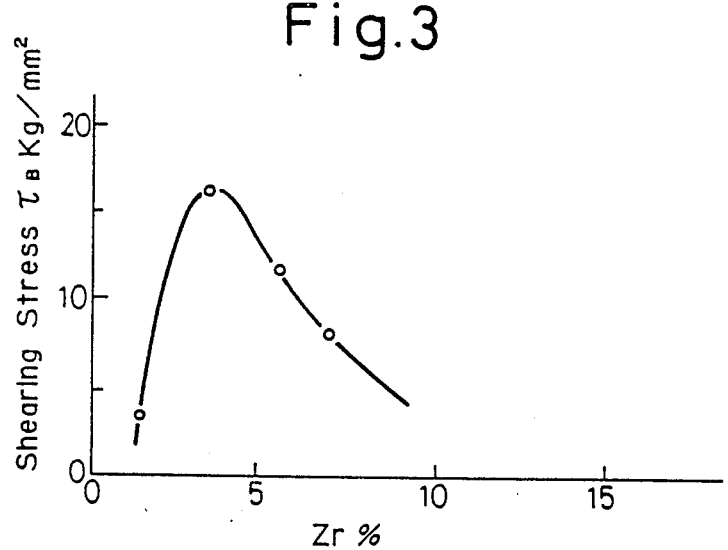
FIG. 3 shows the relationship between the percentage (%) of Zr and the shearing stress $\tau_B$ ($kg/mm^2$), changing the amount of Zr in the composition containing 19.5% by weight of Nb, 2.54% by weight of C, 2.44% by weight of Si and 1.6% by weight of SiC whisker; and, FIG. 4 shows the relationship between the percentage (%) of Si and the shearing stress $\tau_B$ ($kg/mm^2$), changing the amount of Si in the composition containing 19.5% by weight of Nb, 2.54% by weight of C, 4.5% by weight of Zr and 2.0% by weight of SiC whisker.

The measured results of the shearing strength $\tau_B$ of the compositions No. 12–No. 15 of Table 1 comprising 19.5% by weight of Nb, 2.54% by weight of C, 2.44% by weight of Si, 1.6% by weight of SiC whisker and a changed percentage of Zr are shown in FIG. 3, from which it is apparent that, when Zr is about 3.5% by weight, the strength is highest.

Figure 4:
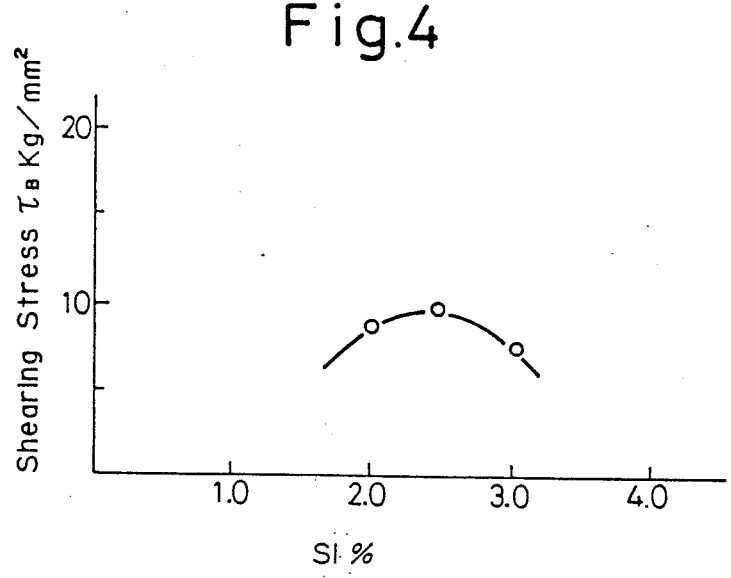

The measured results on the shearing strength $\tau_B$ of the compositions No. 16–No. 18 of Table 1 comprising 19.5% by weight of Nb, 2.54% by weight of C, 4.5% by weight of Zr, 2.0% by weight of SiC whisker and a changed percentage of Si are shown in FIG. 4, from which it is apparent that, when Si is about 2.5% by weight, the strength is highest.

The compositions No. 19–No. 21 of Table 1 were obtained by changing the percentages of Nb, Cr, and Zr to 11.0% by weight, 9.5% by weight and 1.5% by weight, respectively, in the composition No. 5 or further adding 16.6% by weight of SiC whisker or 1.5% by weight of Mn of the composition No. 5. As seen from the results of Table 1, when SiC whisker is added, the strength is improved, and the addition of Mn does not adversely affect the strength.

The compositions No. 22–No. 24 of Table 1 do not include Nb and comprise 19.0% by weight of Cr, 3.0% by weight of Zr, 14.3% by weight of SiC whisker and changed contents of C and Si, respectively. As seen from the results of Table 1, even when the composition does not contain Nb, the metallized layer has considerable strength.

When the compositions No. 25 and No. 26 containing W are compared with the composition No. 13 containing no W, it is found that, when the amount of W is large, the strength is decreased.

Comparative Example

The compositions No. 27 to No. 29 in Table 1 are comparative examples, wherein the composition having component ranges outside the present invention was metallized in the same manner as Example 1. In these comparative examples, a desired adhesion could not be obtained.

TABLE 1 (a)

| | Metallizing Composition | | | | Balance (% by weight) | | | Shearing Strength |
|---|---|---|---|---|---|---|---|---|
| No. | Nb | Cr | C | Si | Ni Zr | SiC Whisker | Others | (kg/mm²) |
| 1 | 19.5 | — | 2.54 | 2.44 | 3.5 | 2.5 | — | 22.3 |
| 2 | 14.5 | 5.0 | 2.54 | 2.44 | 3.5 | 2.0 | — | 32.0 |
| 3 | 7.5 | 12.0 | 2.54 | 2.44 | 3.5 | 2.0 | — | 28.4 |
| 4 | — | 19.5 | 2.54 | 2.44 | 3.5 | 2.0 | — | 17.8 |
| 5 | 15.0 | 5.0 | 2.54 | 2.44 | 3.5 | — | — | 7.0 |
| 6 | 15.0 | 5.0 | 2.54 | 2.44 | 3.5 | 1.0 | — | 12.5 |
| 7 | 15.0 | 5.0 | 2.54 | 2.44 | 3.5 | 1.6 | — | 15.2 |
| 8 | 15.0 | 5.0 | 2.54 | 2.44 | 3.5 | 2.5 | — | 15.5 |
| 9 | 15.0 | 5.0 | 2.54 | 2.44 | 3.5 | 5.0 | — | 15.6 |
| 10 | 15.0 | 5.0 | 2.54 | 2.44 | 3.5 | 7.5 | — | 13.7 |
| 11 | 15.0 | 5.0 | 2.54 | 2.44 | 3.5 | 16.7 | — | 4.6 |
| 12 | 19.5 | — | 2.54 | 2.44 | 1.5 | 1.6 | — | 3.4 |
| 13 | 19.5 | — | 2.54 | 2.44 | 3.5 | 1.6 | — | 16.2 |
| 14 | 19.5 | — | 2.54 | 2.44 | 5.5 | 1.6 | — | 10.9 |
| 15 | 19.5 | — | 2.54 | 2.44 | 7.0 | 1.6 | — | 8.2 |
| 16 | 19.5 | — | 2.54 | 2.0 | 4.5 | 2.0 | — | 8.7 |
| 17 | 19.5 | — | 2.54 | 2.44 | 4.5 | 2.0 | — | 9.6 |
| 18 | 19.5 | — | 2.54 | 3.0 | 4.5 | 2.0 | — | 7.9 |
| 19 | 11.0 | 9.5 | 2.54 | 2.44 | 1.50 | — | — | 9.9 |
| 20 | 11.0 | 9.5 | 2.54 | 2.44 | 1.50 | 16.6 | — | 16.6 |
| 21 | 11.0 | 9.5 | 2.54 | 2.44 | 1.5 | — | Mn 1.5 | 9.4 |
| 22 | — | 19.0 | 2.25 | 1.88 | 3.0 | 14.3 | — | 16.8 |
| 23 | — | 19.0 | 2.20 | 2.07 | 3.0 | 14.3 | — | 10.9 |
| 24 | — | 19.0 | 2.60 | 2.3 | 3.0 | 14.3 | — | 16.2 |
| 25 | 19.5 | — | 2.54 | 2.44 | 1.7 | — | W 10.0 | 15.8 |
| 26 | 19.5 | — | 2.54 | 2.44 | 3.5 | 1.6 | W 15.0 | 8.0 |
| 27 | 23.5 | — | 1.5 | — | 1.5 | — | — | peeling |
| 28 | 23.5 | — | 1.8 | — | — | — | Mo 10.0 | peeling |
| 29 | — | 17.0 | 1.0 | 7.0 | — | — | Fe 25.0 | peeling |

EXAMPLE 2

Each of the compositions No. 30–No. 35 according to the present invention shown in Table 2 was applied in the form of paste and metallized on the end surface of Al₂O₃ sintered body having a purity of 99.5%, a diameter of 22 mm and a height of 7 mm in the same manner as in Example 1, then a kovar alloy was brazed using a eutectic silver brazing alloy. Thereafter, the shearing strength was measured to determine if the strength was sufficient for practical use, as shown in Table 2.

TABLE 2

| No. | Metallizing Composition | | | | Balance Ni Zr | (% by weight) SiC Whisker | Others | Shearing Strength (kg/mm²) |
|---|---|---|---|---|---|---|---|---|
| | Nb | Cr | C | Si | | | | |
| 30 | 15.0 | 5.0 | 2.54 | 2.44 | 3.5 | 2.5 | — | 8.9 |
| 31 | 15.0 | 5.0 | 2.54 | 2.44 | 3.5 | 1.0 | — | 13.1 |
| 32 | 15.0 | 5.0 | 2.54 | 2.44 | 3.5 | — | — | 8.2 |
| 33 | 5.0 | 15.0 | 2.54 | 2.44 | 5.0 | 1.0 | — | 11.7 |
| 34 | — | 18.5 | 3.1 | 2.8 | 4.5 | — | Pb 8.0 | 21.8 |
| 35 | 2.0 | 18.5 | 3.1 | 2.8 | 4.5 | — | Pb 8.0 | 10.3 |

EXAMPLE 3

Each of the compositions No. 36–No. 46 according to the present invention shown in Table 3 was also applied in the form of paste combined with sub-micron sized SiC powder as an SiC compound and metallized on the end surface of an $Si_3N_4$ sintered body having a diameter of 15.0 mm and a height of 7.0 mm, in the same manner as in Examples 1 and 2, then a kovar alloy of the same size as in Example 2 was brazed using a eutectic silver brazing alloy. Thereafter, the shearing strength was measured to determine if the strength was sufficient for practical use, as shown in Table 3.

TABLE 3

| No. | Metallizing Composition | | | | | Balance Ni Ti | (% by weight) SiC (Powder) | Others | Shearing Strength (kg/mm²) |
|---|---|---|---|---|---|---|---|---|---|
| | Nb | Cr | C | Si | Zr | | | | |
| 36 | 14.5 | 5.0 | 2.54 | 2.44 | 3.25 | 0.25 | 2.0 | — | 4.9 |
| 37 | 14.5 | 5.0 | 2.54 | 2.44 | 3.0 | 0.50 | 2.0 | — | 3.3 |
| 38 | 14.5 | 5.0 | 2.54 | 2.44 | 2.5 | 1.0 | 1.0 | — | 8.1 |
| 39 | 14.5 | 5.0 | 2.54 | 2.44 | 2.0 | 1.5 | 2.0 | — | 2.9 |
| 40 | 14.5 | 5.0 | 2.54 | 2.44 | 3.5 | 1.0 | 2.0 | — | 6.5 |
| 41 | 14.5 | 5.0 | 2.54 | 2.44 | 5.0 | 1.0 | 2.0 | — | 5.9 |
| 42 | 7.5 | 12.0 | 2.54 | 2.44 | 3.0 | 0.5 | 2.0 | — | 2.6 |
| 43 | 19.5 | — | 2.54 | 2.44 | 3.0 | 0.5 | 2.0 | — | 4.2 |
| 44 | 14.5 | 5.0 | 2.54 | 2.44 | 3.0 | 0.5 | 2.0 | W 10.0 | 2.0 |
| 45 | 14.5 | 5.0 | 2.54 | 2.44 | 3.0 | 0.5 | 2.0 | Ta 10.0 | 6.8 |

EXAMPLE 4

Each of the compositions No. 46–No. 55 according to the present invention and shown in Table 4 was also applied in the form of a paste combined with sub-micron sized SiC powder as an SiC compound and metallized on the end surface of the same $Si_3N_4$ sintered body as obtained in Example 3 and Example 1, in the same manner as in Examples 1, 2, 3, then the same kavor alloy as in Examples 2, 3 was brazed using the same eutectic silver brazing alloy. The composition No. 56 according to the present invention also shown in Table 4 was also prepared and sintered in the same way as above. Then the kovar alloy was brazed in the same was as above to obtain a comparative strength. The result shows that there is no great difference between the powder and the whisker since, even in the case of the powdery form of the SiC compound, if the amount mixed and the particle size of the powder has a value corresponding to that required by the present invention, a relatively high strength can be obtained.

TABLE 4

| No. | Metallizing Composition | | | | Balance Ni | (% by weight) Zr | SiC | Shearing Strength (kg/mm²) |
|---|---|---|---|---|---|---|---|---|
| | Nb | Cr | C | Si | | | | |
| 46 | 14.5 | 5.0 | 2.54 | 2.44 | 3.5 | Powder 1.0 | | 5.2 |
| 47 | 14.5 | 5.0 | 2.54 | 2.44 | 3.5 | Powder 2.0 | | 6.5 |
| 48 | 14.5 | 5.0 | 2.54 | 2.44 | 3.5 | Powder 5.0 | | 1.3 |
| 49 | 15.0 | 5.0 | 2.54 | 2.44 | 3.5 | Powder 0.5 | | 6.5 |
| 50 | 15.0 | 5.0 | 2.54 | 2.44 | 3.5 | Powder 1.0 | | 7.2 |
| 51 | 15.0 | 5.0 | 2.54 | 2.44 | 3.5 | Powder 1.6 | | 5.2 |
| 52 | 15.0 | 5.0 | 2.54 | 2.44 | 3.5 | Powder 2.5 | | 6.5 |
| 53 | 15.0 | 5.0 | 2.54 | 2.44 | 3.5 | Powder 5.0 | | 5.2 |
| 54 | 15.0 | 5.0 | 2.54 | 2.44 | 3.5 | Powder 7.5 | | 5.2 |
| 55 | 15.0 | 5.0 | 2.54 | 2.44 | 3.5 | Powder 16.7 | | 1.3 |
| 56 | 14.5 | 5.0 | 2.54 | 2.44 | 3.5 | Whisker 2.0 | | 6.6 |

I claim:

1. A composition for metallizing a surface of ceramics by a melting process, said composition essentially consisting of 3.0 to 22.0% by weight of Nb, not more than 20.0% by weight of Cr, the sum of Nb and Cr being 13.0 to 25.0% by weight, 0.5 to 8.0% by weight of at least one of Zr, Ti, and Hf, 1.5 to 3.5% by weight of C, 1.5 to 3.5% by weight of Si, 0.5 to 18.0% by weight of SiC, not more than 10.0% by weight of at least one of Fe, Co, Cu, Mn, Pd, Pt, Ag, Al, Rh, Ru, Au, and V, not more than 22.0% by weight of at least one of W, Ta, Re, and Os, and the balance being Ni.

2. A composition according to claim 1, wherein said composition essentially consists of 3.0 to 22.0% by weight of Nb, not more than 20.0% by weight of Cr, the sum of Nb and Cr being 15.0 to 22.0% by weight, 1.0 to 5.0% by weight of Zr, 1.5 to 3.5% by weight of C, 1.5 to 3.5% by weight of Si, 0.5 to 18% by weight of SiC as a form of powder, not more than 22% by weight of at least one of W and Ta, and the balance being Ni.

3. A composition according to claim 1, wherein said composition essentially consists of 3.0 to 22.0% by weight of Nb, not more than 20.0% by weight of Cr, the sum of Nb and Cr being 15.0 to 22.0% by weight, 1.0 to 5.0% by weight of Zr, 0.1 to 3.0% by weight of Ti, 1.5 to 3.5% by weight of C, 1.5 to 3.5% by weight of Si, 0.5 to 18% by weight of SiC, not more than 22% by weight at least one of W and Ta, and the balance being Ni.

4. A composition according to claim 1, wherein said SiC is in the form of a whisker.

5. A composition for metallizing a surface of ceramics by a melting process, said composition essentially consisting of 3.0 to 22.0% by weight of Nb, not more than 20.0% by weight of Cr, the sum of Nb and Cr being 15.0 to 22.0% by weight, 0.5 to 8.0% by weight of at least one of Zr, Ti, and Hf, 1.5 to 3.5% by weight of C, 1.5 to 3.5% by weight of Si, 0.5 to 18.0% by weight of SiC, not more than 10.0% by weight of at least one of Fe, Co, Cu, Mn, Pd, Pt, Ag, Al, Rh, Ru, Au, and V, not more than 22.0% by weight of at least one of W, Ta, Re, and Os, and the balance being Ni.

6. A powdery composition for metallizing a surface of ceramics by a melting process, said powdery composition essentially consisting of 3.0 to 22.0% by weight of Nb, not more than 20.0% by weight of Cr, the sum of Nb and Cr being 13.0 to 25.0% by weight, 0.5 to 8.0% by weight of at least one of Zr, Ti, and Hf, 1.5 to 3.5% by weight of C, 1.5 to 3.5% by weight of Si, 0.5 to 18.0% by weight of SiC, not more than 10.0% by weight of at least one of Fe, Co, Cu, Mn, Pd, Pt, Ag, Al, Rh, Ru, Au, and V, not more than 22.0% by weight of at least one of W, Ta, Re, and Os, and the balance being Ni.

7. A powdery composition according to claim 6, wherein said SiC is in the form of a whisker.

8. A paste composition for metallizing a surface of ceramics by a melting process, said composition comprising a mixture of powders and an organic binder, wherein said mixture of powders essentially consists of 3.0 to 22.0% by weight of Nb, not more than 20.0% by weight of Cr, the sum of Nb and Cr being 13.0 to 25.0% by weight, 0.5 to 8.0% by weight of at least one of Zr, Ti, and Hf, 1.5 to 3.5% by weight of SiC, not more than 10.0% by weight of at least one of Fe, Co, Cu, Mn, Pd, Pt, Ag, al, Rh, Ru, Au, and V, not more than 22.0% by weight of at least one of W, Ta Re, and Os, and the balance being Ni.

9. A paste composition according to claim 8, wherein said SiC is in the form of a whisker.

* * * * *